United States Patent
Lau et al.

(10) Patent No.: US 7,221,937 B2
(45) Date of Patent: May 22, 2007

(54) EVENT REMINDER METHOD

(75) Inventors: Anthony P. Lau, Kitchener (CA); Gheorghe Curelet-Balan, Kitchener (CA)

(73) Assignee: Research In Motion Limited, Waterloo (CA)

( * ) Notice: Subject to any disclaimer, the term of this patent is extended or adjusted under 35 U.S.C. 154(b) by 438 days.

(21) Appl. No.: 10/429,590

(22) Filed: May 5, 2003

(65) Prior Publication Data

US 2003/0224762 A1 Dec. 4, 2003

Related U.S. Application Data

(60) Provisional application No. 60/377,644, filed on May 6, 2002.

(51) Int. Cl.
*H04M 3/00* (2006.01)

(52) U.S. Cl. .................. 455/419; 455/550.1; 455/2.01; 455/557

(58) Field of Classification Search ............. 455/550.1, 455/405, 408, 412.1, 412.2, 414.1, 414.2, 455/414.4, 456.1, 456.2, 456.6, 201, 552.1, 455/556.1, 556.3, 557, 3.03, 417, 418, 419, 455/420, 412, 9, 453, 90.1, 90.2, 2.01, 3.05; 709/229, 237, 203

See application file for complete search history.

(56) References Cited

U.S. PATENT DOCUMENTS 6,381,580 B1    4/2002 Levinson

| | | |
|---|---|---|
| 2002/0010615 A1 | 1/2002 | Jacobs |
| 2002/0087382 A1* | 7/2002 | Tiburcio ..................... 705/9 |
| 2003/0060214 A1* | 3/2003 | Hendrey et al. ............ 455/456 |
| 2003/0069983 A1* | 4/2003 | Mukund ..................... 709/229 |
| 2003/0135559 A1* | 7/2003 | Belloti et al. ............... 709/206 |
| 2004/0203847 A1* | 10/2004 | Knauerhase et al. ...... 455/456.1 |

FOREIGN PATENT DOCUMENTS

| | | | |
|---|---|---|---|
| EP | 1 008 946 A1 | | 6/2000 |
| WO | WO 00/22860 | * | 4/2000 |
| WO | WO 00/22860 A1 | * | 4/2000 |
| WO | WO 01/04577 | * | 1/2001 |
| WO | WO 01/04577 A1 | | 1/2001 |
| WO | WO 01/27759 A2 | | 4/2001 |

OTHER PUBLICATIONS

Pyron et al., Special Edition Using Microsoft Project 2000, Sep. 2000, QUE Publishing, pp. 3, 5, 144-145, 222, 213-216, 226-227, 443, 611-612, 655, 676-680 and 1079.*

* cited by examiner

*Primary Examiner*—Edward F. Urban
*Assistant Examiner*—John J. Lee
(74) *Attorney, Agent, or Firm*—Jones Day; Krishna K. Pathiyal; Robert C. Liang

(57) ABSTRACT

A mobile device that uses events as triggers for reminders in addition to date and time. Such events may be location-based, or based on other events or tasks scheduled by the user and other events or tasks scheduled by another user.

23 Claims, 6 Drawing Sheets

EVENT REMINDER METHOD

This application incorporates by reference and claims the benefit of priority from U.S. Provisional Application No. 60/377,644 filed on May 6, 2002.

BACKGROUND OF THE INVENTION

1. Field of the Invention

This invention relates to the field of notification applications. In particular this invention relates to an event reminder method for mobile devices.

2. Description of the State of the Art

A mobile device includes a two-way communication device, a data-messaging device, a two-way pager, a cellular telephone with data messaging capabilities, a wireless Internet appliance, and a data communication device. The mobile device includes a microprocessor that controls at least a display, flash memory, RAM, auxiliary input/output (I/O) subsystems, serial port, a keyboard, and a short-range communications subsystem.

Most scheduling applications on mobile devices use dates and times for scheduling. For example, a calendar application may signal an alert to remind a user of an upcoming appointment a set amount of time before the appointment starts. Typical calendar applications do not take into account delays, how long tasks take to accomplish, sequence of events, or another user's task list or location.

SUMMARY

In one aspect of the invention, there is provided an application for a mobile device that uses events as triggers for reminders in addition to date and time. Such events may be location-based, or based on other events or tasks scheduled by the user and other events or tasks scheduled by another user.

In another aspect of the invention, there is provided a mobile device that uses events as triggers for reminders in addition to date and time. Such events may be location-based, or based on other events or tasks scheduled by the user and other events or tasks scheduled by another user.

Further features of the invention will be described or will become apparent in the course of the following detailed description.

BRIEF DESCRIPTION OF THE DRAWINGS

In order that the invention may be more clearly understood, the one or more embodiments thereof will now be described in detail by way of example, with reference to the accompanying drawings, in which.

DETAILED DESCRIPTION

Figure 1:
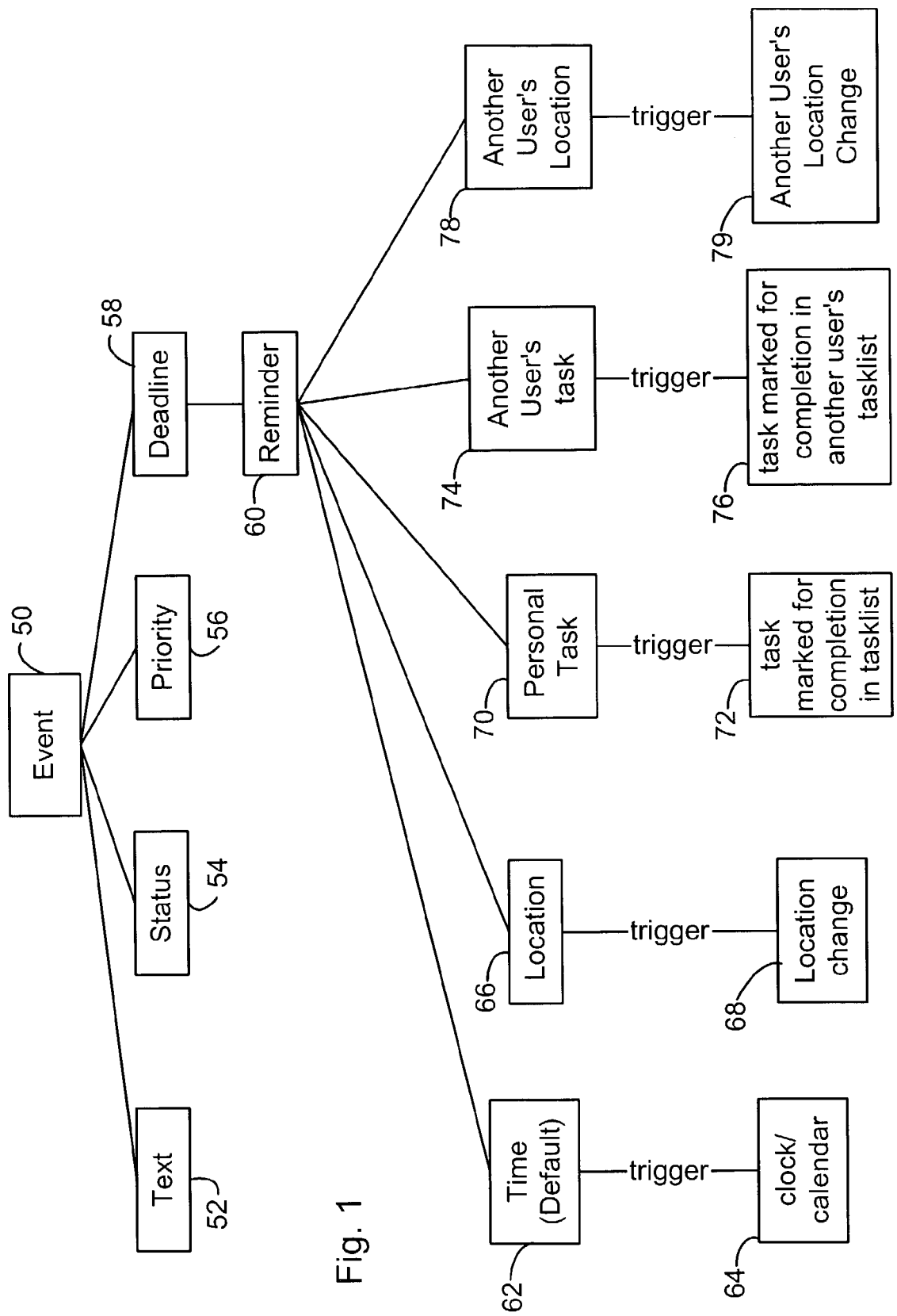
FIG. 1 is a block diagram displaying the different types of reminders for a handheld device.

FIG. 1 is a block diagram displaying the structure of an event, either from a task list application or a calendar application on a handheld device. An event 50 is comprised preferably of text 52, status 54, priority 56, and a deadline 58. Text 52 may include the subject or title of the event 50. Status 54 is preferably defined by the state of the progress of the event 50. For example, if the event 50 hasn't begun yet, then the status 54 may be set to 'Not Started'. If the event 50 has been started and not completed, the status 54 preferably is set to 'In Progress'. If the event 50 has been finished, then the status 54 changes to 'Completed'. These are illustrative examples of the status 54 of an event 50 and are not limited to these examples. A plurality of examples and possible states may exist.

The priority 56 of an event 50 is defined preferably as the importance of the event 50 and may be set to low, normal or high. This setting is based on the urgency of the event 50.

The deadline 58 of an event 50 is defined preferably as the limiting factor of the event. The event 50 is completed whenever the deadline 58 requirements are satisfied. When the deadline 58 is set, a reminder 60 may be set to remind a user of the deadline 58. The reminder 60 may be set according to at least one preference such as time 62, location 66, a personal task 70 from the device task list application, an event from second user's device task list application or calendar 74, or a second user's location 78. The reminders are not limited to these exemplary preferences, and may be set according to a plurality of preferences.

The preferable default preference for a reminder 60 is time 62. If the user chooses to base the reminder 60 on time 62, the user chooses a date or time for which the reminder 60 is to be triggered.

If the user chooses to trigger the reminder 60 with a location 66, the user preferably sets the location for which the reminder is to activate. The location may be listed as a base station of GPS (Global Position System) coordinate. When the user enters said location. Location may be defined in several ways, not limited to, but including base station identifiers, latitude/longitude coordinates, and geographical mapping information (such as area names of cities, regions, countries, etc.). It will be understood by those skilled in the art that the location may be detected from a number of different location detection means, which means include GPS, proximity to a beacon, and proximity to a base-station.

In terms of the display of location information to the user, the technical methods that the device may use to determine location may not need to be shown in its entirety. Abstraction of this information is possible through the use of device-based software, computer-based software connected to the device, and or waypoint information (as a user defined location). Using additional location-based software tools, the user may be able to choose from a database of locations pre-programmed into the software. The user may then choose from this list, leaving the technical determination to the software. Similarly, software may also be used to help define customizable areas (for example, via mouse input on a computer), which may then be used to build a database for the user to select as described above. Waypoints are another method of entry whereby the user may easily enter in an area by using current location as a marker. At a particular location that the user wishes to mark and record for future use, the user may save the user's present location to a database on the device. Subsequently, the user may then use this waypoint as criteria for future reminders.

The user may choose to base an event reminder 60 on a task from the user's device's task list application 70. In this case, once a task is marked as complete, preferably the reminder 60 for the second task is triggered 72. To set the reminder, the device preferably lists the uncompleted tasks for the user to choose from.

If a first user chooses to base a first event reminder 60 on a second event from a second user's device's task list application or calendar application 74, the first device preferably seeks permission from the second user in order to link the two events. If permission is granted by the second user, then whenever the second user marks the chosen second event as completed, the second user's device notifies the first user's device, triggering the reminder for the first event. Further alternately, the second user's device may notify the first user's device using email notification where the second user's device notifies the first user's device with an email having the reminder for the first event (where the second user's device having been provided with the reminder for the first event as part of the seeking permission).

The user may choose to base an event reminder 60 on a second user's location 78. The first device preferably requests updates of a second user. The second user's device either pushes the location updates to the first user's device or the first user's device polls the second user's device for the updates.

In a further embodiment the user may be able to choose an event reminder based on combinations of preferences. For example, the user may choose to base event reminders on a series of tasks as well as time. In this case, when a user creates a series of tasks, a reminder for a first task may be set according to an elapsed amount of time from when the task started. A reminder for a second task may depend on both the relative time from when the first task was completed.

Figure 2:
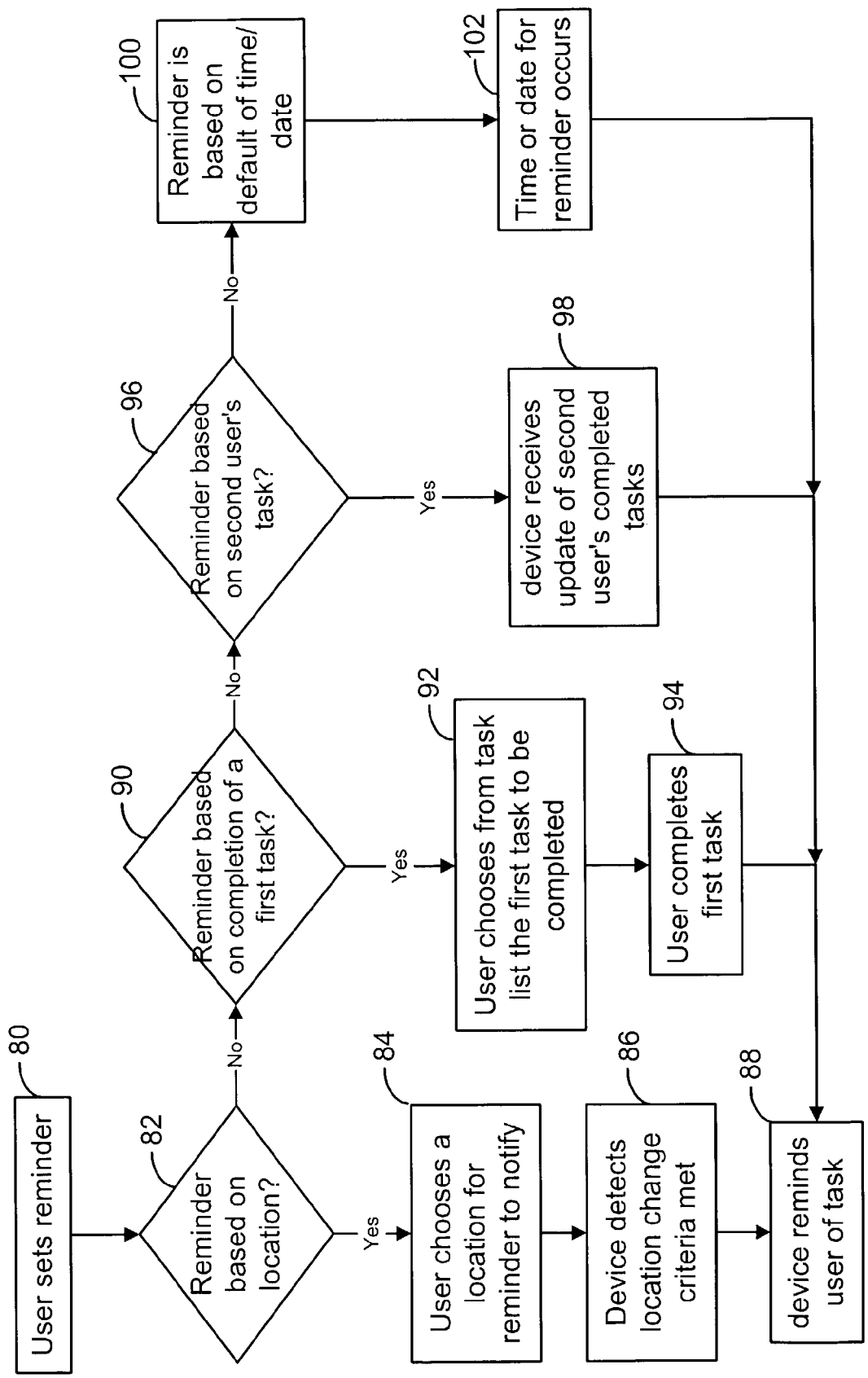
FIG. 2 is a flow diagram showing the steps taken when a user creates a reminder for an event on a handheld device.

FIG. 2 is a flow diagram showing the steps taken when a user creates a reminder on a handheld device. When a user creates a task or a calendar event, the user may be able to set a reminder for the task or appointment as an option in step 80. The reminder is preferably based on several factors that the user may choose from. If the user decides to base the reminder on location in step 82, then the user chooses a location for which the reminder notifies the user of the task or appointment in step 84. In step 86, the device detects when the user has entered the chosen location and in step 88, the device notifies or remind the user of the task or appointment.

If the reminder is not based on location, then a reminder may be based on the completion of a first task in step 90. In step 92, the user preferably chooses a task from the task list on the device. This first task is marked for completion before the reminder notifies the user of a second task. In step 94, when the user completes the first task and marks the first task in the task list as completed, then the device reminds the user of the impending appointment or next task in step 88. An example of when such a reminder may be used is in the form of a recipe. A user may enter the series of steps of the recipe as tasks. For a recipe with sequential steps, the user may set a reminder for a second step of a recipe based on the completion of a first step of the recipe that immediately preceded the second step.

If the reminder is not based on either location or the completion of a first task, then the reminder may be based on the completion of second user's event as in step 96. When a reminder is based on completion of an event in second user's task list or calendar, then when that other person has marked the chosen event for completion, preferably an update is sent from the other person's device or organizer to the user's device in step 98. Then in step 88, the device preferably reminds the user of the impending appointment or task that was saved on the device.

If the reminder is not based on any of the above, then the reminder is based preferably on a default of time or date. In step 100, the user preferably chooses a date or time that the user wishes to be reminded of the appointment or task that the user has created. In step 102, once this date or time has occurred, the device preferably alerts the user to remind the user of the impending event that needs to be completed in step 88.

Figure 3:
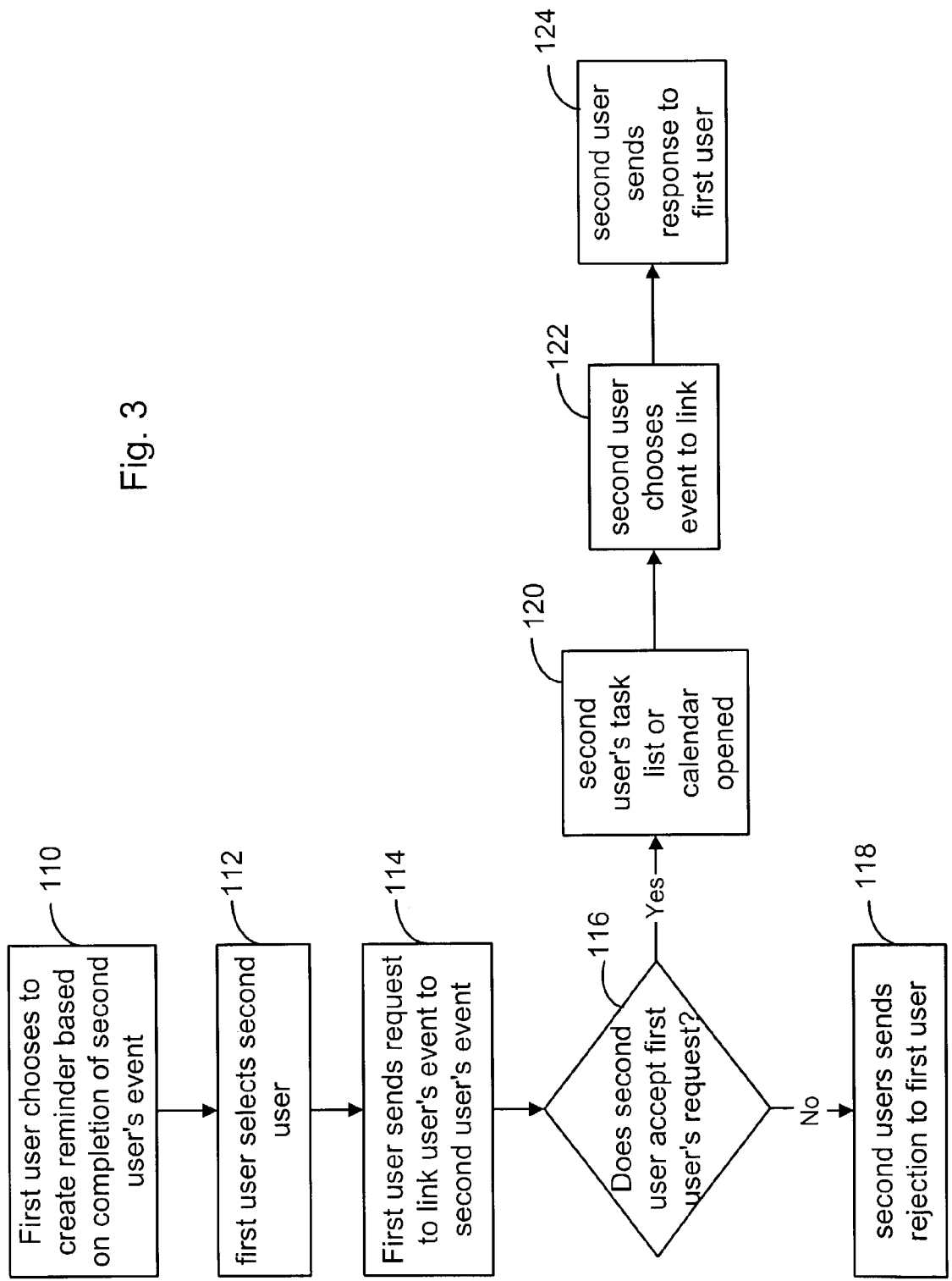
FIG. 3 is a flow diagram showing more detailed steps when a user creates a reminder for an event based on second user's task list.

FIG. 3 is a flow diagram showing more detailed steps when a user creates a reminder based on second user's event. A first user chooses to base the reminder on the completion of a second user's event in step 110. The first user chooses the second user. Preferably, this selection is made from the first user's contact list or address book application on the device. This selection may also be made from an e-mail address that the first user enters.

Once the second user is selected, preferably, a request from the first user's device is sent to the second user requesting to link the first user's event to an event in the second user's task list or calendar in step 114. If, in step 116, the second user does not accept the first user's request, then in step 118, the second user's device preferably sends a rejection to the first user.

If the second user accepts the first user's request, then in step 120, preferably the second user's device opens the task list or calendar from which the second user chooses the event to be linked to the first user's event. Once this second event is chosen by the second user in step 122, the second user's device preferably sends a response to the first user detailing the second event of the second user to which the first user's event is linked in step 124.

Figure 4:
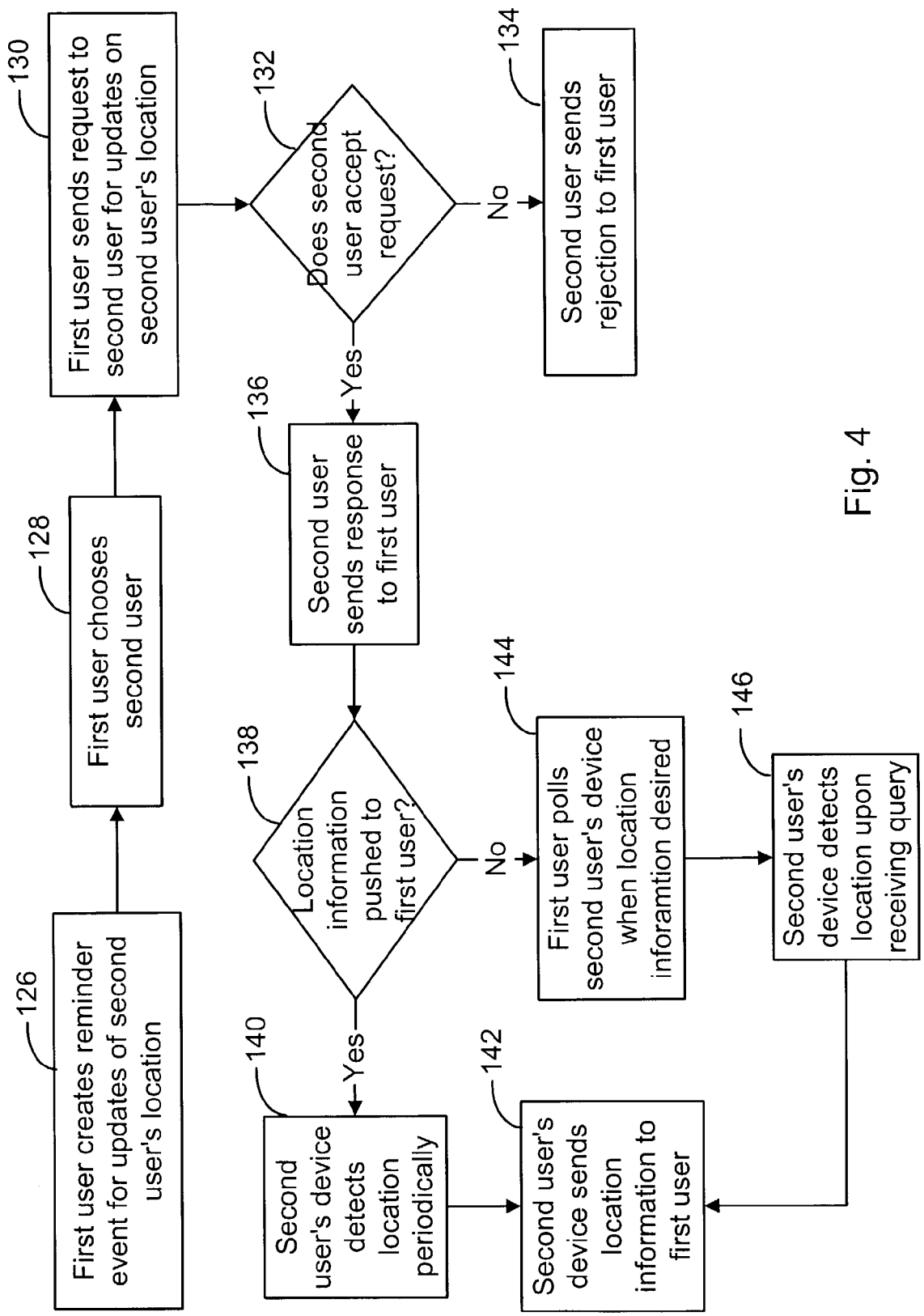
FIG. 4 is a flow diagram showing the steps for a first user's device to request location updates from a second user's device.

FIG. 4 is a flow diagram showing the steps for a first user to request location information from a second user. In step 126, the first user creates an event with a reminder for updates of a second user's location. The first user chooses a second user, in step 128. The first user preferably chooses the second user from an address list application on the device. In step 130, the first user's device sends a request to the second user for updates on the second user's location. If in step 132, the second user does not accept the first user's request then, in step 134, a rejection of the first user's request is sent from the second user's device to the first user's device.

If in step 132, the second user accepts the first user's request, then in step 136, the second user's device sends an acceptance response to the first user.

The location information may be either pushed or pulled from the second user's device. If in step 138, the information is pushed to the first user's device from the second user's device, then in step 140, the second user's device preferably detects its location through mechanisms such as GPS, base station identification, or via geographical mapping software on the device or on a server at regular intervals. In step 142, the second user's device preferably sends the detected location to the first user's device.

If in step 138, the information is not pushed to the first user's device, then in step 144, the first user's device preferably polls the second user's device for an update of the second user's location. In step 146, upon receiving the query from the first user's device, the second user's device preferably detects its location. The second user's device preferably sends the location that was detected to the first user's device.

Figure 5:
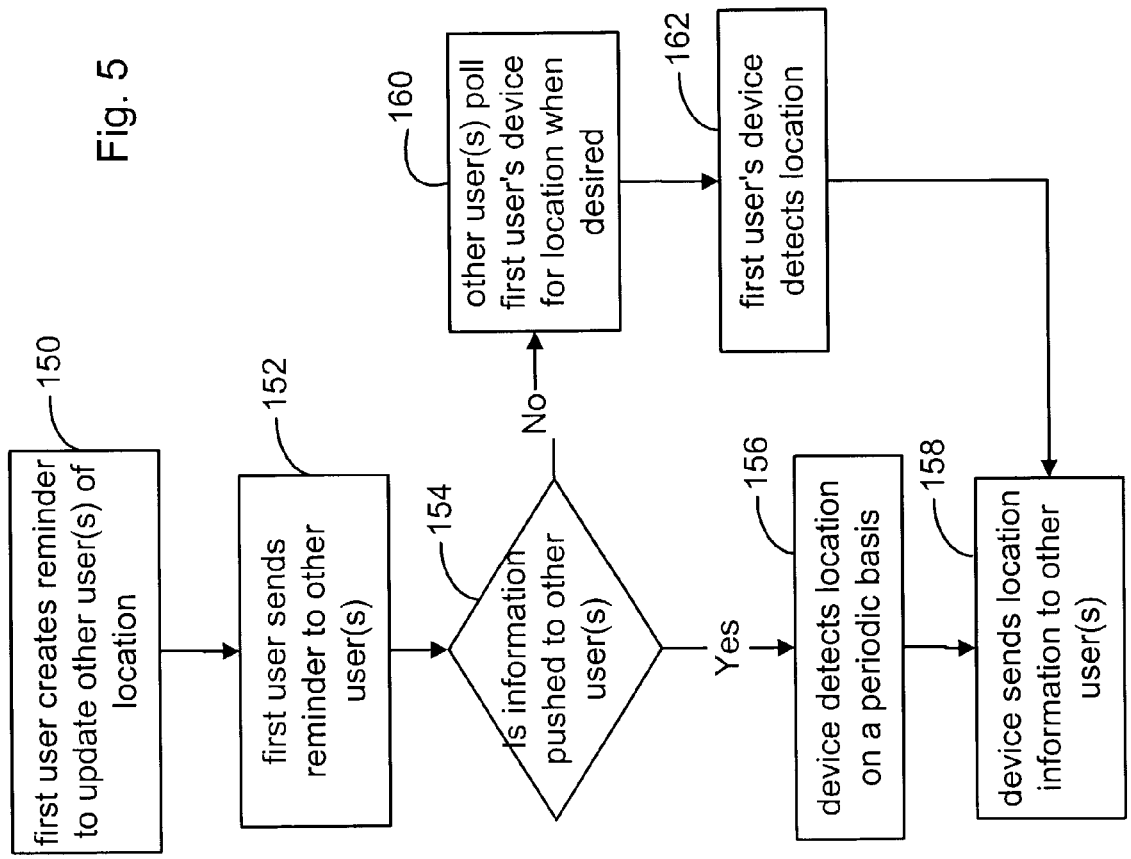
FIG. 5 is a flow diagram showing steps for a first user to send location updates to one or more other users.

FIG. 5 is a flow diagram showing the steps for updating a user's location. In step 150, a first user creates a reminder to update one or more other users of the first user's location. In step 152, the first user sends the reminder to the one or more other users. An example of this may be when a mail delivery person progress along his/her route, wishing to update his/her current location to the post office. The device then starts updating people of the location, either on a periodic basis or when polled by the other users. The first user's location information may be pushed to the one or more other users or the one or more other users may request the first user's location information from the user's device, as depicted in step 154.

If the location information is pushed to the one or more other users, then in step 156, the first user's device preferably detects the location through mechanisms such as GPS, base station identification, detecting whether the device is in or out of a docking cradle, or via geographical mapping software on the device or on a server. In step 158, the first user's device preferably sends the location information to the one or more other users.

If the location information is requested by the one or more other users, then in step 160, the one or more other users preferably poll the first user's device for the location information. In step 142, the first user's device preferably detects the information when it receives the request from the one or more other users. The first user's device preferably sends the location information to the one or more other users, as in step 158.

Figure 6:
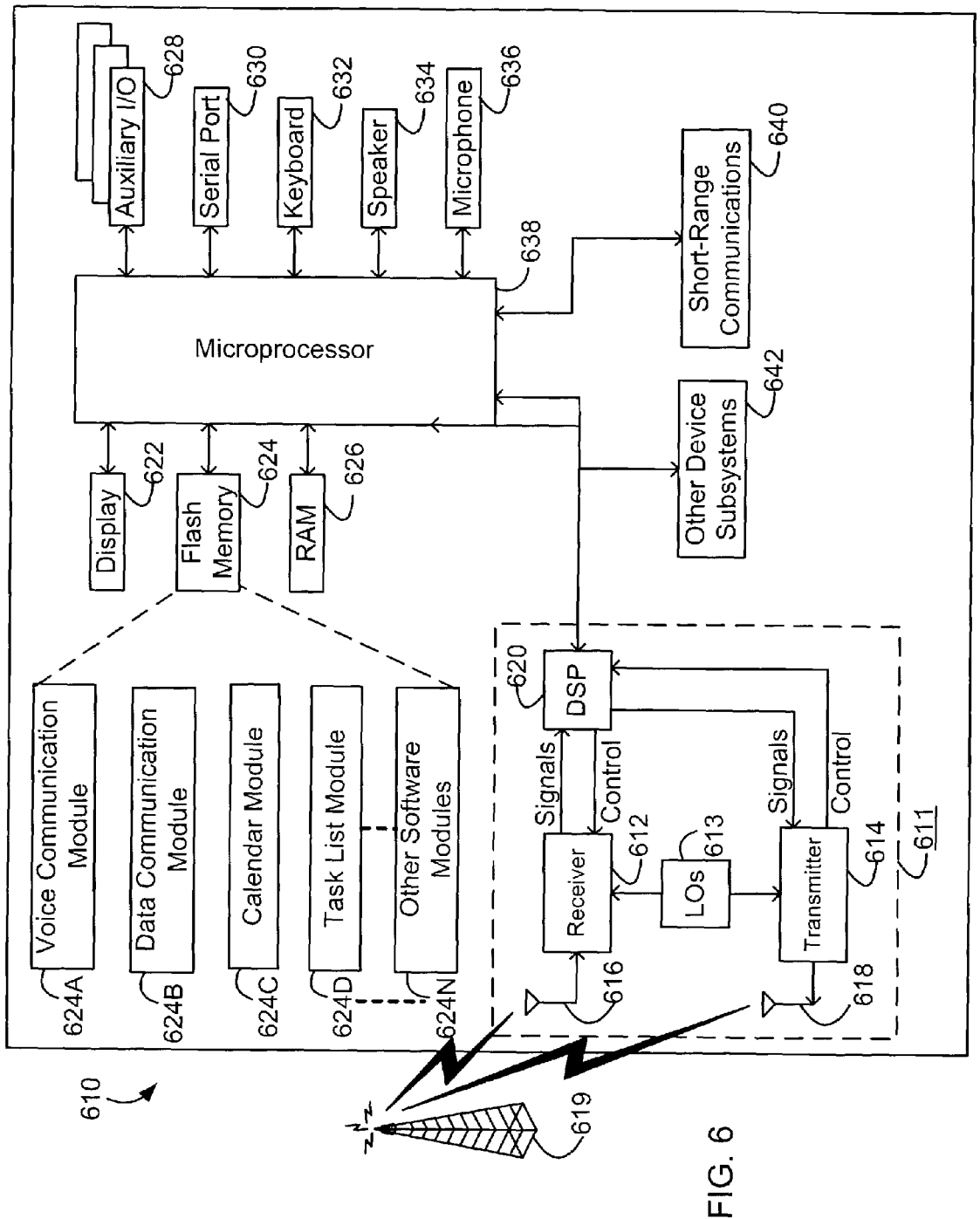
FIG. 6 is a schematic diagram of a wireless communication device that may be used with the systems and methods described herein.

FIG. 6 shows a typical mobile communication device 610, which is preferably a two-way communication device. The device preferably has the capability to communicate with other computer systems on the Internet. Depending on the functionality provided by the device, the device may be referred to as a data messaging device, a two-way pager, a cellular telephone with data messaging capabilities, a wireless Internet appliance or a data communication device (with or without telephony capabilities).

Where the device 610 is enabled for two-way communications, the device incorporates a communication subsystem 611, including a receiver 612, a transmitter 614, and associated components such as one or more, preferably embedded or internal, antenna elements 616 and 618, local oscillators (LOs) 613, and a processing module such as a digital signal processor (DSP) 620. As will be apparent to those skilled in the field of communications, the particular design of the communication subsystem 611 is dependent upon the communication network in which the device is intended to operate. For example, a mobile device 610 destined for a North American market may include a communication subsystem 611 designed to operate within the Mobitex mobile communication system or DataTAC mobile communication system, whereas a mobile device 610 intended for use in Europe may incorporate a GPRS communication subsystem 611.

Network access requirements also vary depending upon the type of network 619. For example, in the Mobitex and DataTAC networks, mobile devices such as 610 are registered on the network using a unique identification number associated with each device. In GPRS networks however, network access is associated with a subscriber or user of a device 610. A GPRS device therefore requires a subscriber identity module (not shown), commonly referred to as a SIM card, in order to operate on a GPRS network. Without a SIM card, a GPRS device will not be fully functional. Local or non-network communication functions (if any) may be operable, but the mobile device 610 will be unable to carry out any functions involving communications over network 619.

When required network registration or activation procedures have been completed, a mobile device 610 may send and receive communication signals over the network 619. Signals received by the antenna 616 through a communication network 619 are input to the receiver 612, which may perform such common receiver functions as signal amplification, frequency down conversion, filtering, channel selection and the like, and in the example system shown in FIG. 6, analog to digital conversion. Analog to digital conversion of a received signal allows more complex communication functions such as demodulation and decoding to be performed in the DSP 620. In a similar manner, signals to be transmitted are processed, including modulation and encoding for example, by the DSP 620 and input to the transmitter 614 for digital to analog conversion, frequency up conversion, filtering, amplification and transmission over the communication network 619 via the antenna 618.

The DSP 620 not only processes communication signals, but also provides for receiver and transmitter control. For example, the gains applied to communication signals in the receiver 612 and transmitter 614 may be adaptively controlled through automatic gain control algorithms implemented in the DSP 620.

The mobile device 610 preferably includes a microprocessor 638 that controls the overall operation of the device. Communication functions, including at least data and voice communications, are performed through the communication subsystem 611. The microprocessor 638 also interacts with further device subsystems such as the display 622, flash memory 624, RAM 626, auxiliary input/output (I/O) subsystems 628, serial port 630, keyboard 632, speaker 634, microphone 636, a short-range communications subsystem 640 and any other device subsystems generally designated as 642.

Within the Flash memory 624, the device 610 preferably includes a plurality of software modules 624A–624N that are executed by the microprocessor 638 (and/or the DSP 620), including a voice communication module 624A, a data communication module 624B, a calendar software module 624C, a task list software module 624D, and a plurality of other operational modules 624N for carrying out a plurality of other functions.

Some of the subsystems shown in FIG. 6 perform communication-related functions, whereas other subsystems may provide "resident" or on-device functions. Notably, some subsystems, such as keyboard 632 and display 622 for example, may be used for both communication-related functions, such as entering a text message for transmission over a communication network, and device-resident functions such as a calculator or task list.

Operating system software used by the microprocessor 638 is preferably stored in a persistent store such as Flash memory 624. In addition to the operating system, which controls all of the low-level functions of the device 610, the Flash memory 624 may include a plurality of high-level software application programs, or modules, such as a voice communication module 624A, a data communication module 624B, a calendar module 624C, a task list module 624D, or any other type of software module 624N. The Flash memory 624 also may include a file system for storing data. These modules are executed by the microprocessor 638 and provide a high-level interface between a user of the device and the device. This interface typically includes a graphical component provided through the display 622, and an input/ output component provided through the auxiliary I/O 628, and keyboard 632. If the device includes a voice communications module then a speaker 634, and microphone 636 may also be included. The operating system, specific device applications or modules, or parts thereof, may be temporarily loaded into a volatile store, such as RAM 626 for faster operation. Moreover, received communication signals may also be temporarily stored to RAM 626, before permanently writing them to a file system located in the persistent store 624.

Further application modules 624N may also be loaded onto the mobile device 610 through the network 619, an auxiliary I/O subsystem 628, serial port 630, short-range communications subsystem 640 or any other suitable subsystem 642, and installed by a user in the RAM 626 or preferably a non-volatile store for execution by the microprocessor 638. Such flexibility in application installation increases the functionality of the device and may provide enhanced on-device functions, communication-related functions, or both. For example, secure communication applications may enable electronic commerce functions and other such financial transactions to be performed using the mobile device 610.

In a data communication mode, a received signal such as a text message or web page download is processed by the communication subsystem 611 and input to the microprocessor 638, which will preferably further process the received signal for output to the display 622, or alternatively to an auxiliary I/O device 628. A user of mobile device 610 may also compose data items such as email messages for example, using the keyboard 632, which is preferably a complete alphanumeric keyboard or telephone-type keypad, in conjunction with the display 622 and possibly an auxiliary 110 device 628. Such composed items may then be transmitted over a communication network through the communication subsystem 611.

For voice communications, overall operation of the mobile device 610 is substantially similar, except that received signals are preferably outputs to a speaker 634 and signals for transmission are generated by a microphone 636. Alternative voice or audio I/O subsystems such as a voice message recording subsystem may also be implemented on the mobile device 610. Although voice or audio signal output is preferably accomplished primarily through the speaker 634, the display 622 may also be used to provide an indication of the identity of a calling party, the duration of a voice call, or other voice call related information for example.

A short-range communications subsystem 640 is a further optional component that may provide for communication between the device 610 and different systems or devices, which need not necessarily be similar devices. For example, the subsystem 640 may include an infrared device and associated circuits and components or a Bluetooth™ communication module to provide for communication with similarly enabled systems and devices.

It will be appreciated that the above description relates to the preferred embodiment by way of example only. Many variations on the invention will be obvious to those knowledgeable in the field, and such obvious variations are within the scope of the invention as described and claimed, whether or not expressly described.

We claim:

1. A computer implemented method for generating a reminder based on completion of a first user's task, the method being characterized by:

receiving input from a first user on a first mobile wireless communication device to define the first user's task in a first user's task list application, wherein the first user's task is stored on the first mobile wireless communication device in local memory;

receiving input from a second user on a second mobile wireless communication device to define a second user's task in a second user's task list application, wherein the second user's task is stored on the second mobile wireless communication device in local memory;

the second user selecting the first user to send a request to link tasks;

the first user's mobile wireless communications device receiving a wireless communication request to link the first user's task to a the second user's task;

in response to receiving the wireless communication request, the first mobile wireless communications device opening the first user's task list application for the first user to select the first user's task to link;

the first user's mobile communication device receiving input from the first user to approve the request to link tasks;

detecting that the first user's task has been marked as completed in the first user's task list application;

in response to detecting that the first user's task has been marked as completed, generating the reminder to be presented to the second user on the second wireless communication mobile device.

2. The method of claim 1, wherein the reminder indicates the second user's task is to be completed.

3. The method of claim 1, further comprising: setting the reminder to be triggered based on completion of the first user's task and on an elapsed time from the completion of the first user's task, the reminder being generated upon detecting the first user's task has been marked as complete and upon detecting that a preselected amount of time has elapsed from the first user's task being marked as completed.

4. The method of claim 1, wherein the first and second user's tasks are steps in a recipe.

5. The method of claim 1, wherein the reminder is provided to the second mobile wireless communication device in the form of an e-mail.

6. The method of claim 1, wherein the first user's task list application resides on a first user's mobile device.

7. The method of claims 1, wherein the first user is selected from a contact list or address book.

8. The method of claim 1, wherein the first user's task list application includes a calendar application.

9. A method for reminding a first user of a first user's task, triggered by completion of a second user's task, the steps of which comprise:

selecting a second user;

sending a request from the first user to the second user to select and link a task in a first user's task list with a task in a second user's task list;

querying the second user whether to accept the request to select and link tasks;

accepting the request;

in response to accepting the request, opening the second user's task list;

selecting the second user's task from the second user's task list and linking the selected second user's task to the first user's task;

wherein the second user's task list is different from the first user's task list.

10. The method of claim 9, further comprising:

sending a response from the second user to the first user indicating the first user's task has been linked to the second user's task.

11. The method of claim 9, wherein the second user selects the second user's task from the second user's task list on a second user's mobile device.

12. The method of claim 9, wherein the first user chooses the second user's task from the second user's task list on a first user's mobile device.

13. The method of claim 9, wherein the method is performed on first and second mobile devices corresponding to the first and second user, respectively.

14. The method of claim 9, wherein the second user's task list includes a calendar application.

15. The method of claim 9, wherein the tasks in the first user's task list reside in a different memory location than the tasks in the second user's task list.

16. The method of claim 9, wherein all the tasks in the first user's task list are different from all the tasks in the second user's task list.

17. The method of claim 9, wherein the tasks in the first user's task list reside in local memory on a first device that is accessible to the first user, and the tasks in the second user's task list reside in local memory on a second device that is accessible to the second user.

18. A mobile wireless communication device having a first task list comprising:
   a processor;
   a communications subsystem;
   an input device;
   the processor, communications subsystem, and input device configured to:
   select a second mobile wireless communication device upon input from a first user, send a request to the second mobile wireless communication device for access to the second mobile device's task list to link one or more tasks, receive a second mobile wireless communications device's task list from the second mobile wireless communication device, and upon further input from the first user, choose a task from the second mobile wireless communications device's task list, and link the chosen second mobile wireless communications device's task to a task input by the first user;
   wherein the first task list is different from the second mobile wireless communications task list.

19. The mobile wireless communication device of claim 18, wherein the communications system is configured to communicate via a Mobitex, Datatac, or GPRS network.

20. The mobile wireless communication device of claim 18, wherein the processor, communications subsystem, and input device are further configured to receive a second user's task from the second mobile wireless communications device and link the second user's task to the task input by the first user.

21. The mobile wireless communications device of claim 18, wherein the processor and communications subsystem are further configured to query the second mobile wireless communications device to accept or decline the request to link one or more tasks.

22. The mobile wireless communications device of claim 18, wherein the processor is further configured to trigger a reminder upon the completion of the chosen second mobile wireless communications device's task.

23. The mobile wireless communications device of claim 22, wherein the processor and communications subsystem are configured to receive the reminder in the form of an e-mail sent by the second mobile wireless communications device upon the completion of the chosen second mobile device's task.

* * * * *